United States Patent
Hyre et al.

(10) Patent No.: US 7,779,649 B2
(45) Date of Patent: Aug. 24, 2010

(54) GLASS CONTAINER FORMING MACHINE

(75) Inventors: Matthew R. Hyre, Lexington, VA (US);
F. Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 269 days.

(21) Appl. No.: 11/890,056

(22) Filed: Aug. 3, 2007

(65) Prior Publication Data
US 2008/0000268 A1    Jan. 3, 2008

Related U.S. Application Data

(63) Continuation of application No. 10/005,567, filed on Dec. 5, 2001, now abandoned.

(51) Int. Cl.
*C03B 7/00* (2006.01)

(52) U.S. Cl. .......................................... 65/214; 65/267

(58) Field of Classification Search ........... 65/207–208, 65/211, 213, 214, 243, 261, 262, 264, 265, 65/267, 300, 301
See application file for complete search history.

(56) References Cited

U.S. PATENT DOCUMENTS

| | | | |
|---|---|---|---|
| 2,347,181 A | | 4/1944 | Cox |
| 5,807,419 A | * | 9/1998 | Rodriguez-Wong et al. ... 65/229 |

FOREIGN PATENT DOCUMENTS

| | | |
|---|---|---|
| FR | 1350353 | 1/1964 |
| FR | 2147020 | 3/1973 |
| RU | 272503 | 4/1969 |

OTHER PUBLICATIONS

Electric Drives and Their Controls, Richard M. Oxford Science Publications, 1995, pp. 188-191.*

* cited by examiner

*Primary Examiner*—Carlos Lopez
(74) *Attorney, Agent, or Firm*—Reinhart Boerner Van Deuren s.c.

(57) ABSTRACT

A blow head mechanism for an I.S. machine wherein the blow head has a final blow tube. The final blow tube is supported for vertical displacement between an up position where the open end of the final blow tube is proximate the top of a blown parison and a down position where the open end of the final blow tube is proximate the bottom of a blown parison. The final blow tube is oscillated a plurality of times during the time when the blow head is "on".

13 Claims, 17 Drawing Sheets

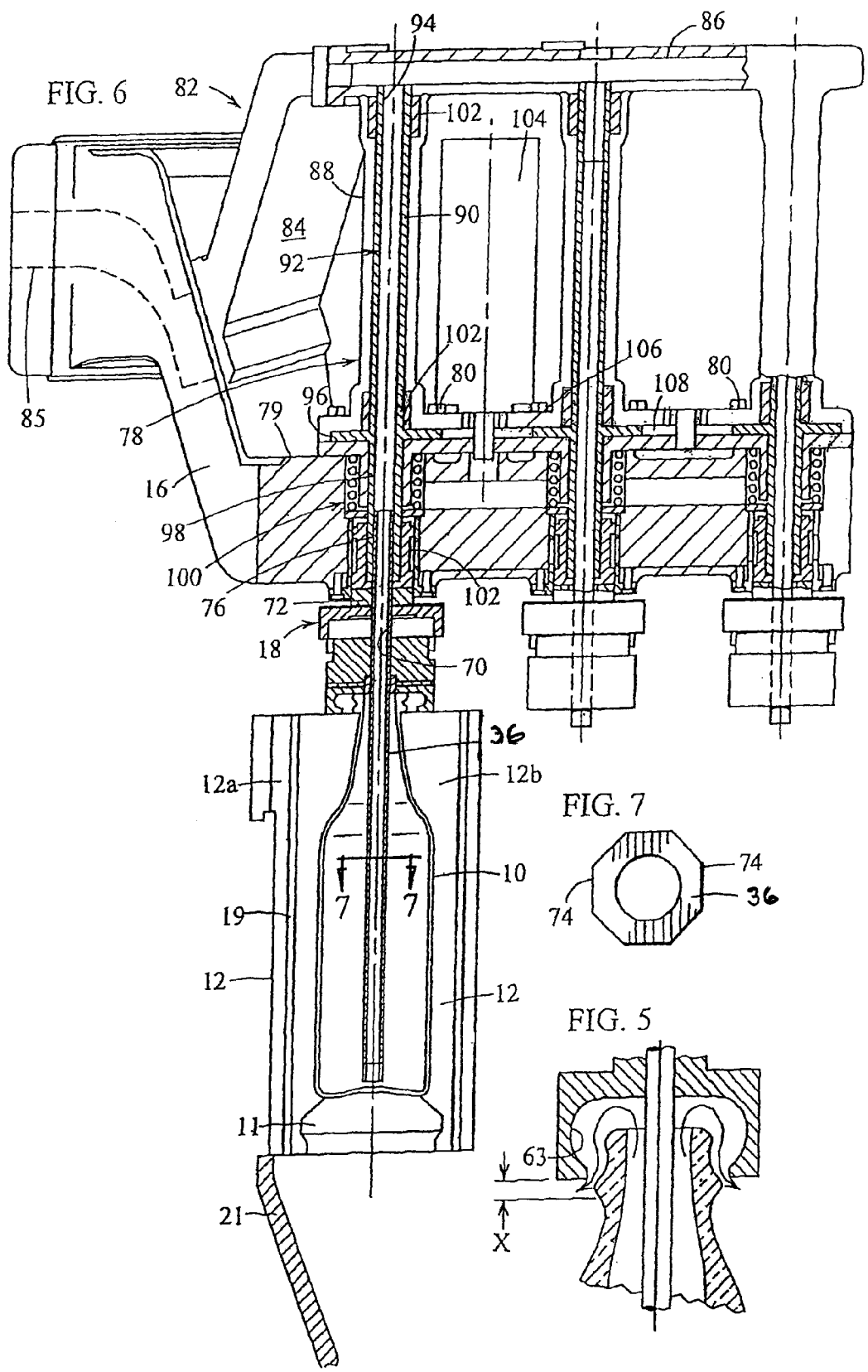

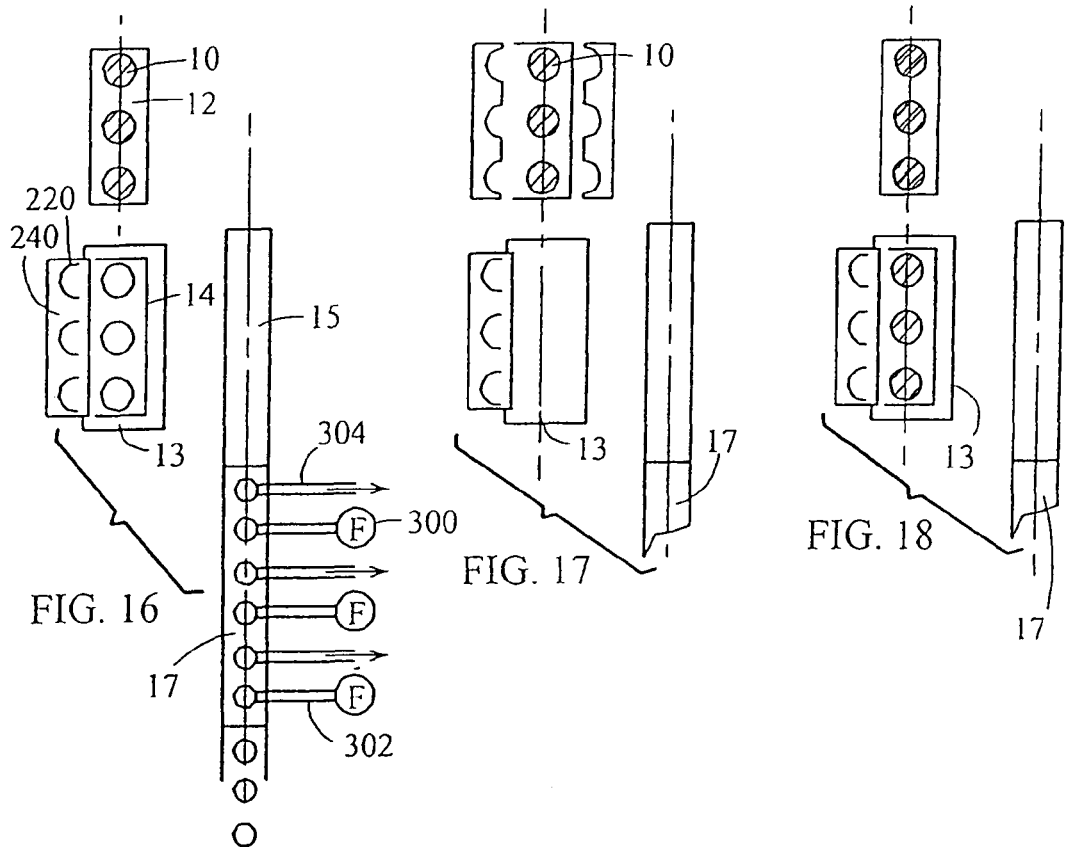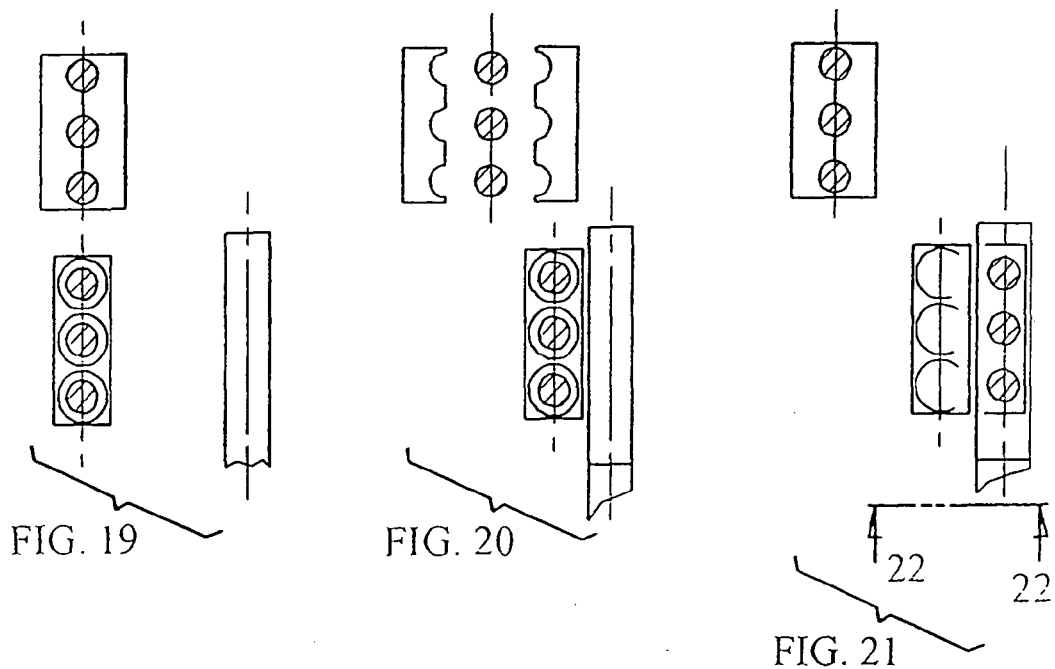

US 7,779,649 B2

GLASS CONTAINER FORMING MACHINE

The present invention is a Continuation of U.S. patent application Ser. No. 10/005,567, filed Dec. 5, 2001, now abandoned.

The present invention relates to I.S. (individual section) glass forming machines which form a parison at a blank station and then at a blow station, first blow the parison and then cool the blown parison to form a bottle and more particularly to the structure for blowing the parison and cooling the blown parison into a bottle and then cooling the bottle to a temperature below the annealing point so that the bottle can then be quickly cooled to room temperature.

BACKGROUND OF THE INVENTION

The blowing operation is effected by a blow head. Conventionally the blow head is brought into position on top of (engaging) a blow mold at the blow station and provides air ("final blow") under pressure through a downwardly extending blow tube to the interior of the parison to blow the parison into contact with the interior of the blow mold. The parison could also be formed with vacuum or with a vacuum assist. The blown parison must then be formed into a bottle, i.e., cooled to the point where it is rigid enough to be gripped and removed from the blow station by a takeout mechanism. The outer surface of the blown parison is cooled by cooling the blow molds and the inner surface of the blown parison is cooled by the final blow air which continues to flow into the blown parison. U.S. Pat. No. 4,726,833 discloses a state of the art blow head. Conventionally the cooling air escapes from the interior of the bottle through a permanently open exhaust. The size of the exhaust will be defined as a balance between inlet and outlet.

Before a conventional takeout can be displaced from a remote location to a pick up location proximate the top of the formed bottle, the blow head, including the blow tube, must be displaced away from the blow mold. This displacement must be at least to a position where it will not interfere with an inwardly moving takeout. To speed up these steps, U.S. Pat. No. 5,807,419, proposes a combined blow head and takeout mechanism. This mechanism permits the operation of takeout jaws as soon as the blow head, which engages the top of the blow molds during final blow, is slightly elevated, with the blow tube remaining fully extended and operating, following the formation of the bottle. The takeout jaws immediately reseal the blow head. The internal cooling of the bottle will accordingly continue as if the blow head was in place on top of the blow mold while the bottle is removed from the blow mold and carried to a dead plate on which it will be deposited. The cooling of the outer surface of the formed bottle stops with the opening of the blow molds.

U.S. Pat. No. 4,508,557, discloses a dead plate arrangement for blowing cooling air around the bottle to provide additional outer surface cooling on the deadplate. U.S. Pat. No. 4,892,183 discloses a dual take-out mechanism which functions to alternately remove bottles from the blow station placing half on one output conveyor and the other half on a second output conveyor.

In all of these systems, the bottles once removed from the deadplate, will be conveyed into a Lehr which utilizes a series of burners to immediately reheat the bottles to a uniform higher temperature and then allows the bottles to cool slowly before being discharged from the Lehr.

Formed bottles have also been tempered in separate machinery by reheating the bottles and then simultaneously cooling the inner and outer glass surfaces (see for example, U.S. Pat. No. 2,309,290).

OBJECT OF THE INVENTION

It is an object of this invention to provide an I.S. machine which more effectively removes heat from the blown parison/formed bottle.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

FIG. 5 is an enlarged elevational view in section of the blow head at the exhaust position;

FIG. 6 shows an elevational view in cross section of the blow head mechanism made in accordance with the teachings of the present invention;

FIG. 7 shows a view of the cooling tube shown in FIG. 6 taken at 7-7 thereof;

FIGS. 16-21 illustrate one of the pair of synchronized takeout/deadplate mechanisms of the present invention moving through a single cycle;

BRIEF DESCRIPTION OF THE PREFERRED EMBODIMENT

Figure 1:
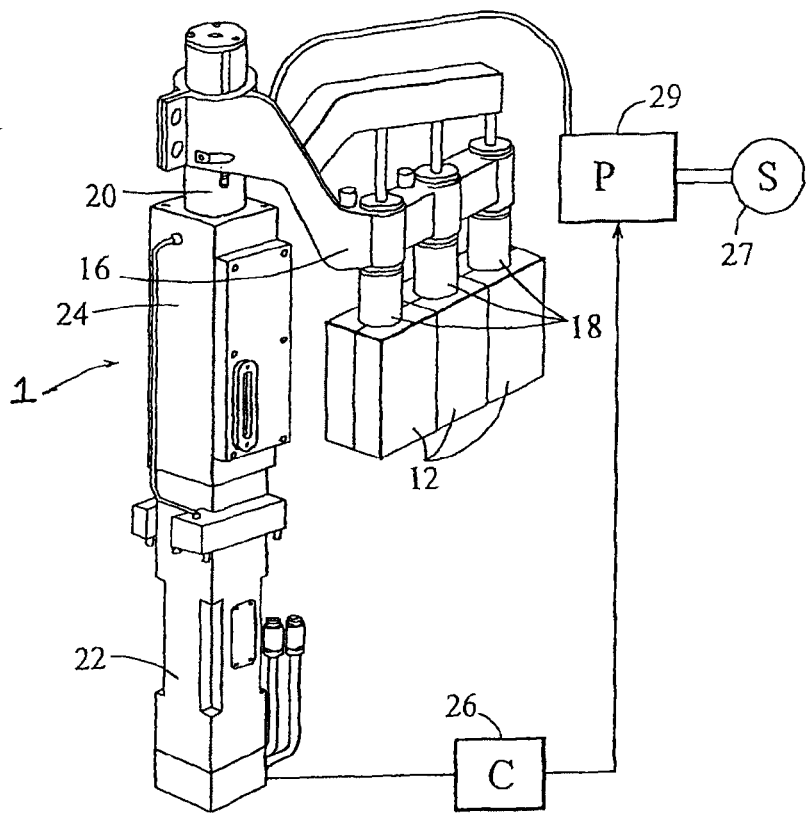
FIG. 1 shows a perspective view of a blow head mechanism made in accordance with the teachings of the present invention.

FIG. 1 shows a blow head mechanism 1 of the blow station of an I.S. machine A triple gob machine is illustrated, and three blow molds 12 arranged side by side are shown. A blow head arm 16 supports three blow heads 18. The blow head arm 16 is mounted on a vertical post 20 coupled to an electronic (servo) motor 22 which causes the blow head arm to move up and down. The post also rotates via a scroll cam (not shown) defined in a housing 24. Such up and down and rotary movement of the post 20 causes the blow heads 18 to be displaced between a retracted "off" position and an advanced "on" position, as shown in FIG. 1, at which the blow heads 18 engage the top of the blow molds 12. The operation of the servo motor is controlled by a control C (26). Air under pressure is supplied from a suitable source 27 to a pressure regulator P (20) which will set the desired pressure for final blow as defined by the control C/26.

Figure 2:
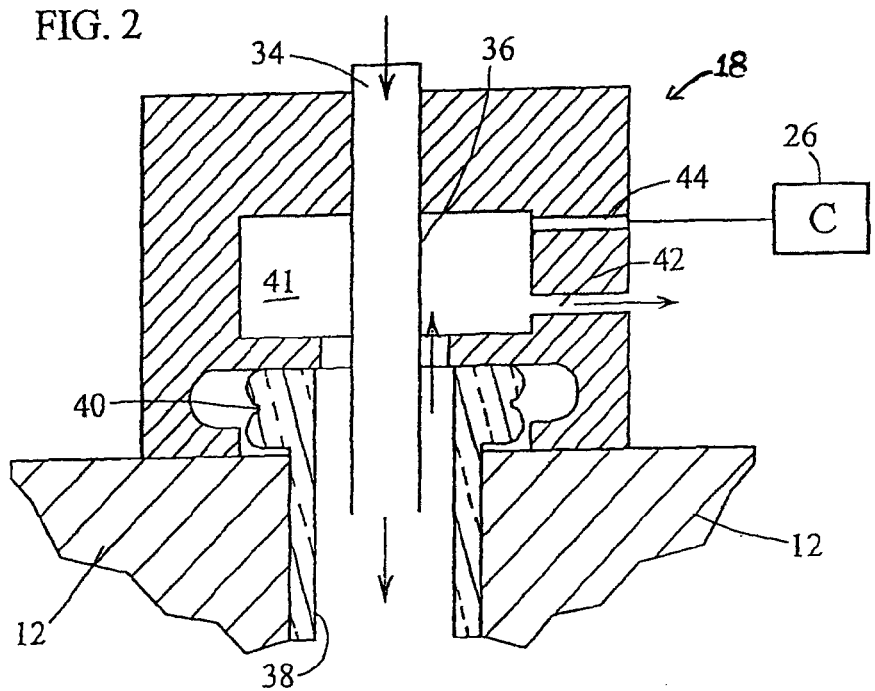
FIG. 2 shows a diagrammatic cross sectional view of the blow head of the blow head mechanism shown in FIG. 1.

A blow head 18 is shown diagrammatically, in section, in FIG. 2. The blow head 18 has an air inlet 34 leading to a blow tube 36 which extends downwardly into the parison 38. The blow head surrounds the finish 40 of the parison. Final blow air blows the parison and then cools the interior surface of the blown parison. Air exhausts upwardly between the blow tube 36 and the parison into a chamber 41 and out through an adjustable exhaust 42. A pressure sensor 44 is arranged to monitor the air pressure in the chamber 41 (closely related to the pressure of the air within the parison).

Figure 3:
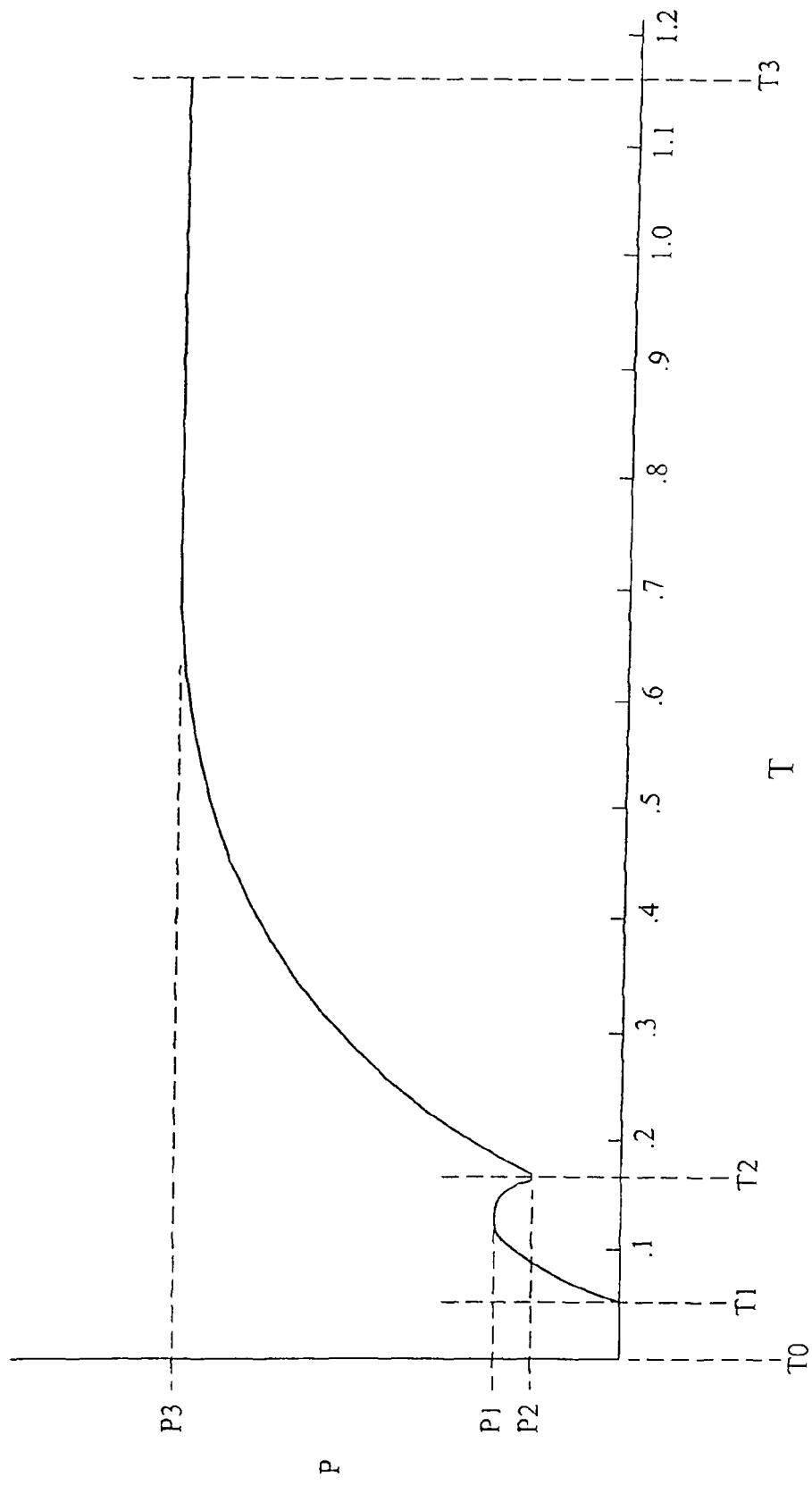
FIG. 3 shows a time versus pressure curve for the operating blow head.
Figure 4:
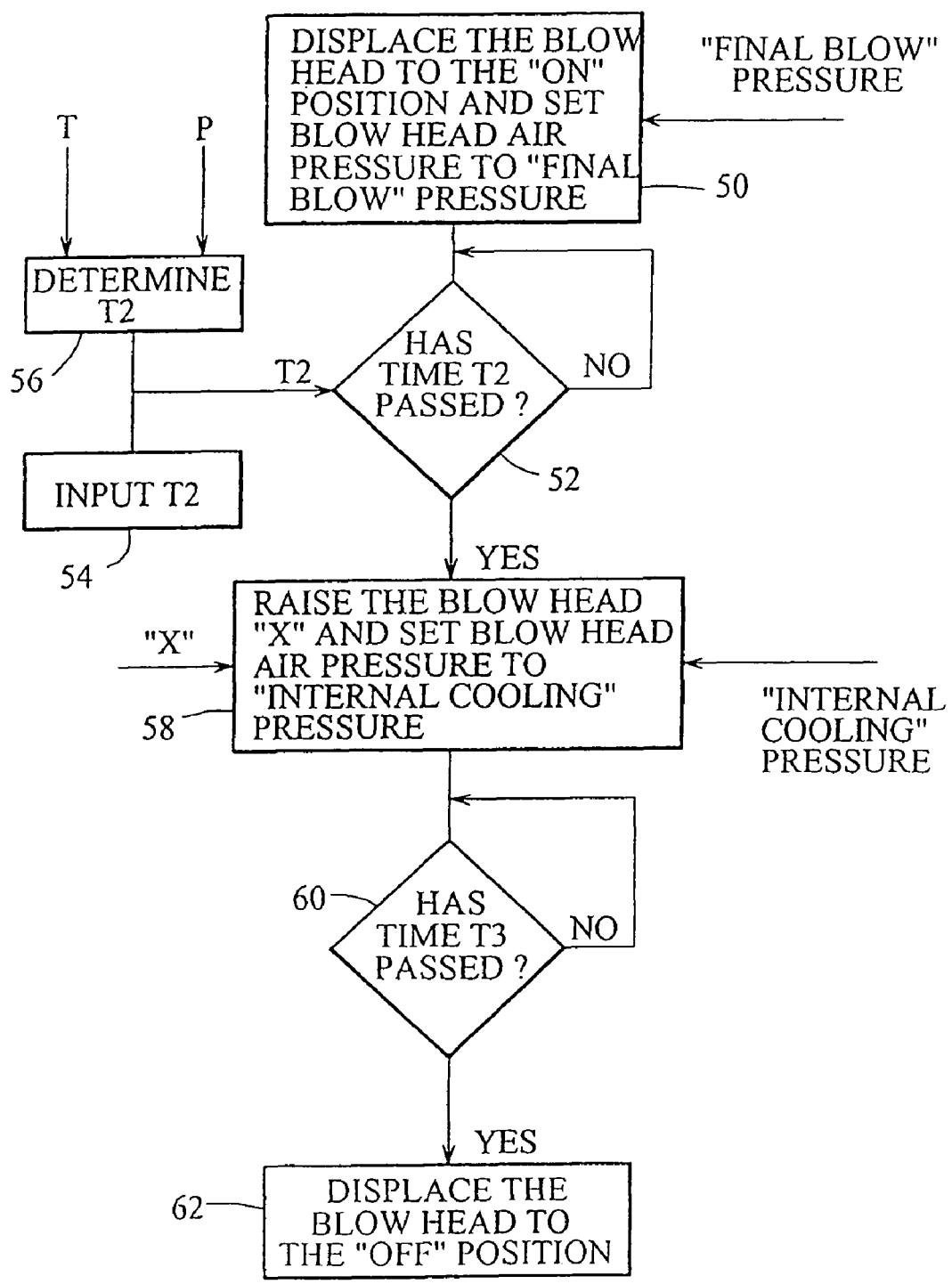
FIG. 4 shows a logic diagram for the operation of the blow head mechanism shown in FIG. 1.

FIG. 3 shows changes that have been discovered in the pressure P in the chamber 41 vs. time T plot. At about T1 seconds (0.05 seconds, for example) after the time T0 when blowing pressure is applied through the air inlet 34, the pressure in the chamber begins to rise. The pressure increases to an initial high P1 and drops to P2 (it is believed that this occurs as the parison rapidly expands). At T2 (0.15 seconds, for example) the parison is blown against the blow mold and the pressure once again increases until it reaches a steady state pressure P3 which continues until the blow head is removed more than one second following the application of final blow. The pressure sensor 44 supplies data to the control C (26). While the curve has been discussed relative the blowing of the parison with pressure, it would be the same with vacuum assist or with the blowing of the parison with negative pressure (i.e., vacuum).

The control first functions to Displace The Blow Head To The "On" Position And Set Blow Head Air Pressure To "Final Blow" Pressure 50. "Final blow" pressure can be selectively set and is a pressure that will result in the parison being properly blown. Conventionally, "final blow" air is supplied from 20-30 PSI. Higher pressure will result in a defective bottle. Pressure is applied for a time T2 which is the time required to blow the parison (until the query "Has Time T2 Passed" 52 is answered in the affirmative). The operator may empirically define and Input T2 54. Alternatively the control can "Determine T2" 56 by determining the location of the negative peak (a local minimum) at P2 (This negative peak may be slightly delayed from the instant when the bottle is fully blown and a correction could then be applied). In practice T2 could be periodically determined with the control receiving updated T2 input. The operator may also reduce T2 if he finds that the blowing of the parison will not be effected. With the parison blown, the control will "Raise The Blow Head "X" And Set Blow Head Air Pressure To "Internal Cooling" Pressure" 58 (X and "internal Cooling" Pressure can be selectively set). This second "on" position is the escape position. The cooling flow is no longer limited by the size of the blow head exhaust. The volume of cooling flow for the remaining second or more before the blow head is turned "off" will be very substantially increased. "Internal cooling" air, can be supplied at a pressure which is substantially higher than final blow air. For example internal cooling air can be supplied at 45 PSI since this is a commonly available air supply. Internal cooling air will be supplied at a pressure sufficient to maintain at least a minimum desired pressure within the bottle. This cooling flow could continue until time T3 (until the query "Has Time T3 Passed?" 60) is answered in the affirmative whereupon the control will "Displace The Blow Head To The "Off" Position" 62.

When the blow head is lifted the vertical distance "X" to the escape position (FIG. 5), exhaust air will be directed by the selectively concavely contoured annular recess surface 63 of the interior opening of the lower portion of the blow head to direct cooling air at the outer vertical surface of the finish.

Each blow head (FIG. 6) has a central axial hole 70 configured to matingly receive the blow tube 36. The blow tube is displaceable vertically but is restrained from rotating by a pair of guide keys 72 which engage opposed flats 74 (FIG. 7) on the outer diameter of the blow tube. The top end portion 76 of the blow tube is cylindrical and threaded having an outer diameter larger then the spacing between opposed flats and the keys accordingly function as a down stop for the blow tube. A blow tube support and drive assembly 78 is mounted on the top surface 79 of the blow head arm with a number of screws 80. The assembly has an air manifold 82 including a link 84 communicating with a final blow air duct 85 in the arm, an overhead distribution manifold 86 and three air distribution legs 88 which depend vertically from the overhead distribution manifold.

Located within each distribution leg is the top portion 90 of a drive member 92 having a threaded internal diameter 94 extending downwardly through the top portion, through a driven gear portion 96 and then through a lower portion 98 which extends downwardly through the blow head mounting assembly 100. The O.D. of the drive member 92 is rotatably supported by three bearings 102. The internal thread of the drive member I.D. threadedly receives the threaded top end portion 76 of the blow tube and vertical displacement of the blow tube will accordingly result whenever the driven gear portion 96 is rotated. Rotation will be controlled by an electronic motor 104 coupled to a drive gear 106. The drive gear engages adjacent driven gear portions of the left two driven gear portions to drive the left two drive members 92 and an idler gear 108 between the right hand pair of driven gear portions 96 drives the right hand drive member.

Figure 8:
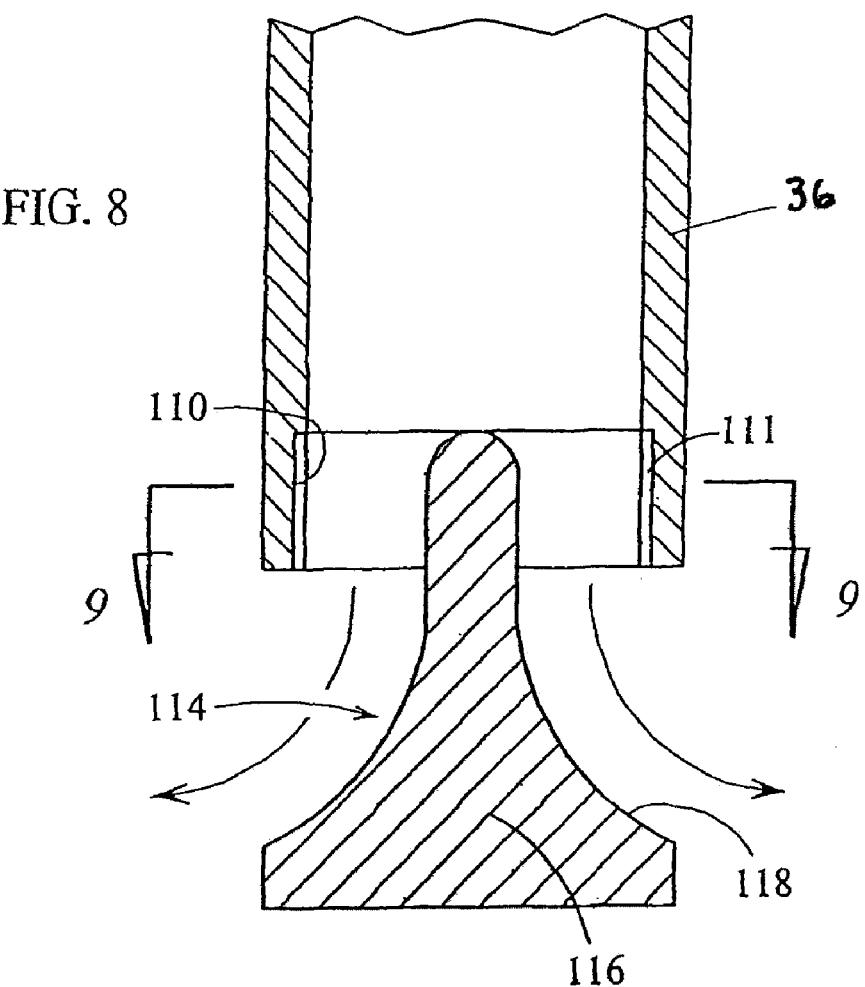
FIG. 8 is an elevational sectional view of the bottom of the cooling tube.
Figure 9:
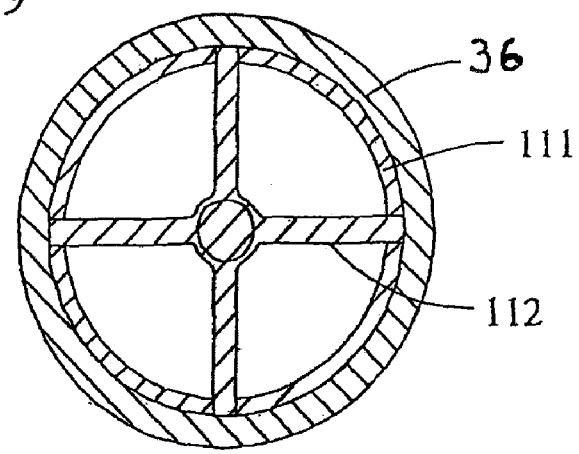
FIG. 9 is a view taken at 9-9 of FIG. 8.

The bottom of the blow tube 36 (FIG. 8) has an annular relief 110 defined in the I.D. The annular upper collar 111 (which is supported by an "X" frame 112) of an air deflector assembly 114, is press fit into the annular relief. Integral with and suspended from the frame 112 is a deflector 116 having an annular concave surface 118 that will divert a portion of the downwardly directed air stream radially outwardly towards the outer wall of the blown parison with the remainder flowing downwardly. FIG. 6 shows the blown parison which when cooled becomes a bottle 10 and shows the blow mold 12 which includes a bottom plate 11 and a pair of mold halves 12a, 12b.

Figure 10:
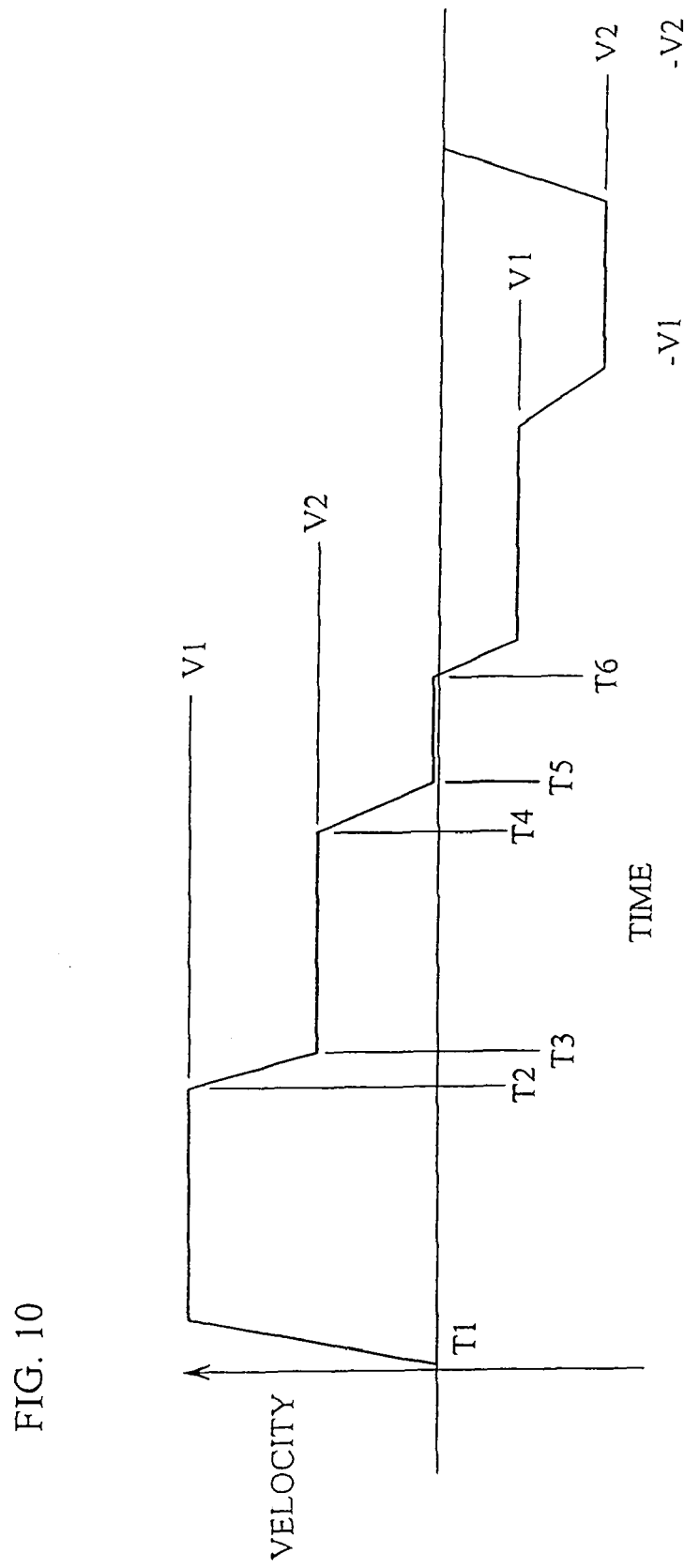
FIG. 10 is a first displacement profile illustrating the vertical displacement of the cooling tube during the blowing and cooling of the parison to form a bottle.

FIG. 10 illustrates an illustrative displacement profile for the blow tube which will blow and cool the parison. The blow head is displaced to the "on" position with the blow tube at the "up" position (T1). The blow tube is then rapidly accelerated to a maximum velocity (V1) and held at that velocity until T2.

Figure 11:
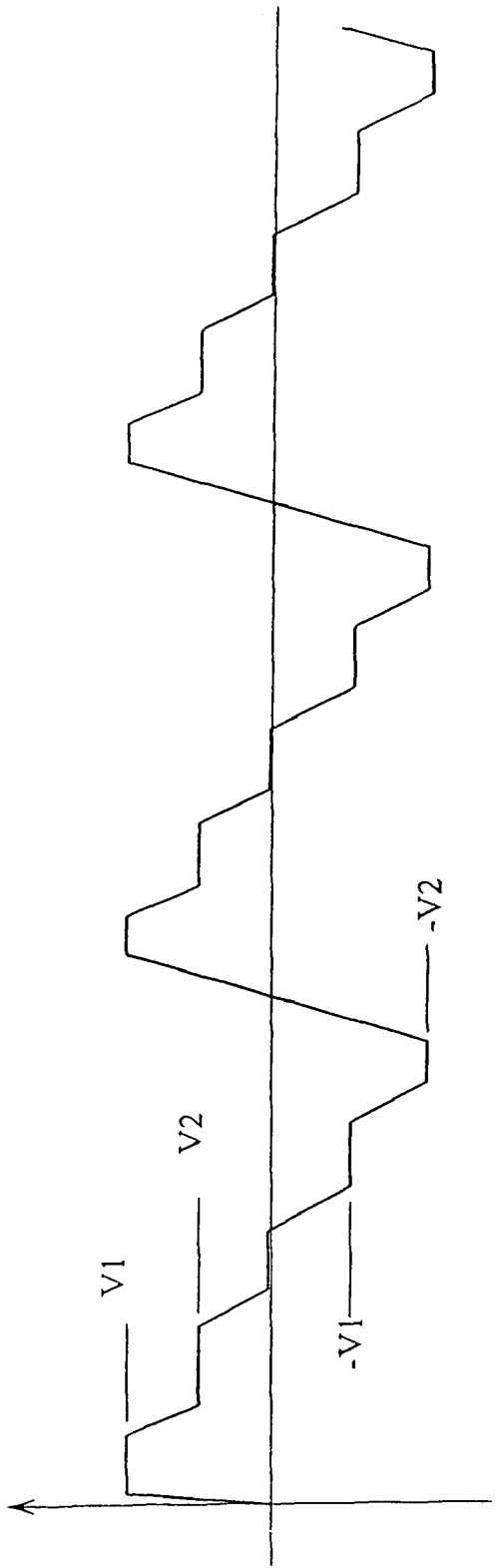
FIG. 11 is a second displacement profile illustrating the vertical displacement of the cooling tube during the blowing of the parison and the cooling of the parison to form a bottle.

The blow tube is then decelerated to a lower velocity V2 at T3 and held at that velocity until T4 when it is decelerated to a stop at its "down" position (T5). The blow tube will then remain at the "down" position until T6. The blow tube will then follow the same profile returning the blow tube to a stop at the "up" position. The blow head can then be removed and the molds opened. The displacement profile will be selected to achieve the desired cooling of the inner surface of the blown parison, i.e., the motion profile is configured to coordinate with the cooling requirements of the container. This coordination can be a coordination based on the heat times the mass of the bottle. As shown in FIG. 6, the bottle has a long neck which has less glass to cool then the body of the bottle. And if the bottle was formed in a blow and blow process, the body of the bottle will be hotter relative to the long neck. As a result the velocity of the blow tube as it proceeds along the neck portion is coordinated with the heat pattern of the bottle (the amount of heat energy desired to be removed along the bottle) and is much faster traversing the long neck than is the velocity traversing the body. Accordingly more cooling will be directed to the body where it is needed. Where the bottom of the formed parison is thicker, even more cooling will be required and the dwell (T6-T5) at the bottom will result in a lot of cooling air being directed at the bottom. Cooling air will continue to rise up along the body and neck to achieve additional cooling when the blow tube is at the bottom (this will also happen at any vertical position). FIG. 11 illustrates a variant displacement profile where the blow tube makes three cycles while the parison is blown and cooled. This coordination could also be a function of the shape of the bottle. For example the bottle might have a bulge which would not be effectively cooled by cooling air flowing upwardly from a nozzle located below the bulge. In this situation like the above cooling of a thicker base the displacement of the cooling nozzle might be either stopped at this bulge to allow more cooling air to be directed into the bulge or slowed down as it displaced upwardly across the bulge to the same effect. The forming process will also be relevant to this coordination. Thickness of the glass as a function of height may vary. In a blow and blow process the upper portion of a container will tend to be colder than the bottom portion and vice versa for a bottle formed in a press and blow process.

Figure 12:
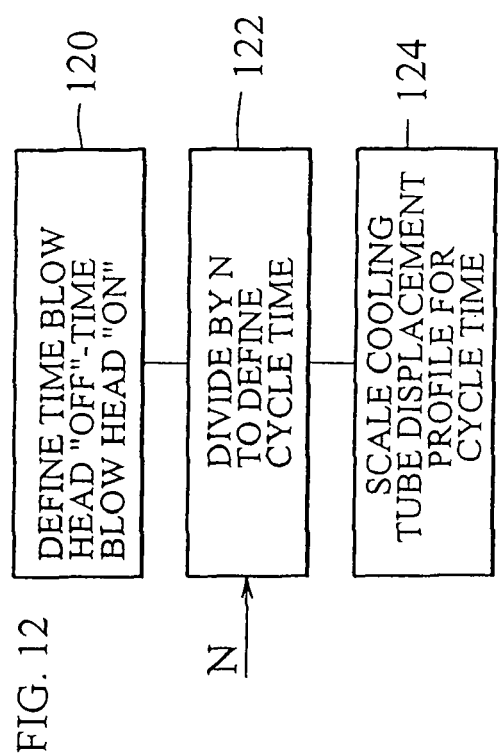
FIG. 12 is a logic diagram illustrating the application of the displacement profile illustrated in FIGS. 10 and 11.

FIG. 12 illustrates a logic diagram for controlling the displacement with different cycles during the time when a parison is blown and cooled. Here the operator inputs the number "N" of cycles desired. The control will Define Time Blow Head "Off"—Time Blow Head "On" 120, proceeds to Divide By "N" To Define Cycle Time 122 and then proceeds to Scale Blow Tube Displacement Profile For Cycle Time 124.

While the blown parison/formed bottle is in the blow mold external cooling will be effected by blowing cooling air through a series of circumferentially located cooling holes 19 defined in the blow molds which are supplied by an air plenum 21 to which the mold bottom plate 11 is secured.

Figure 13:
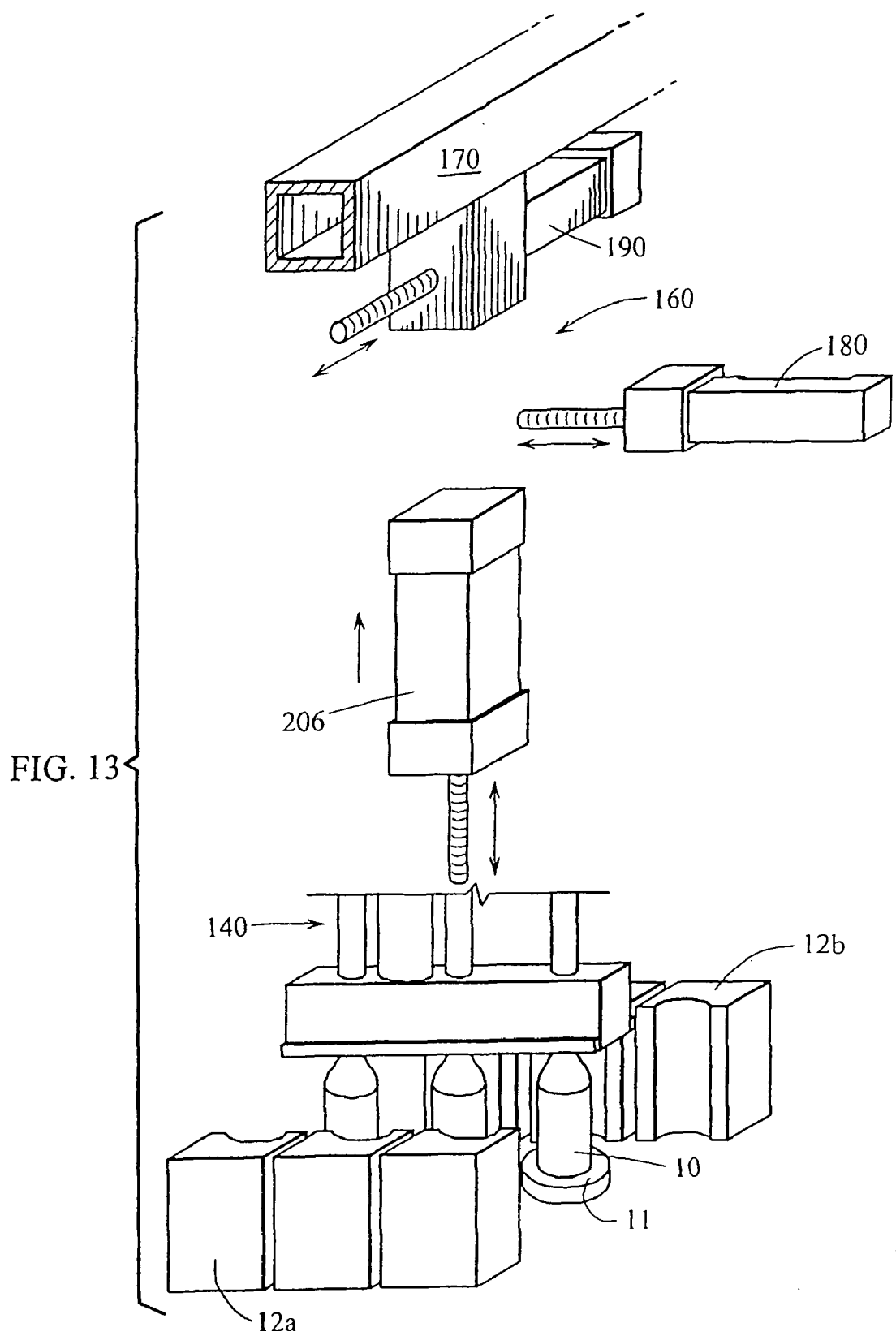
FIG. 13 shows a perspective view of a takeout mechanism made in accordance with the teachings of the present invention.

A takeout mechanism is schematically illustrated in FIG. 13. Three bottles 10 which were formed in blow molds at the blow station are shown standing on the bottom plate 11 of an associated blow mold pair 12a, 12b shown in the open position. The illustrated machine is a triple gob machine and accordingly three bottles 10 were formed. Once the molds are opened, a takeout assembly 140 of a takeout mechanism 150 grips the bottles. The takeout mechanism also includes a three axis support 160 for the takeout assembly that is suspended from a beam 170 that traverses the machine, i.e., spans the 6,8,10,12,16, etc., individual sections of the machine. The three axis support, which includes an X axis drive 180, a Y axis drive 190 and Z axis drive 200, can take a great variety of forms including the form shown in U.S. Pat. No. 4,892,183, which is incorporated by reference herein.

Figure 14:
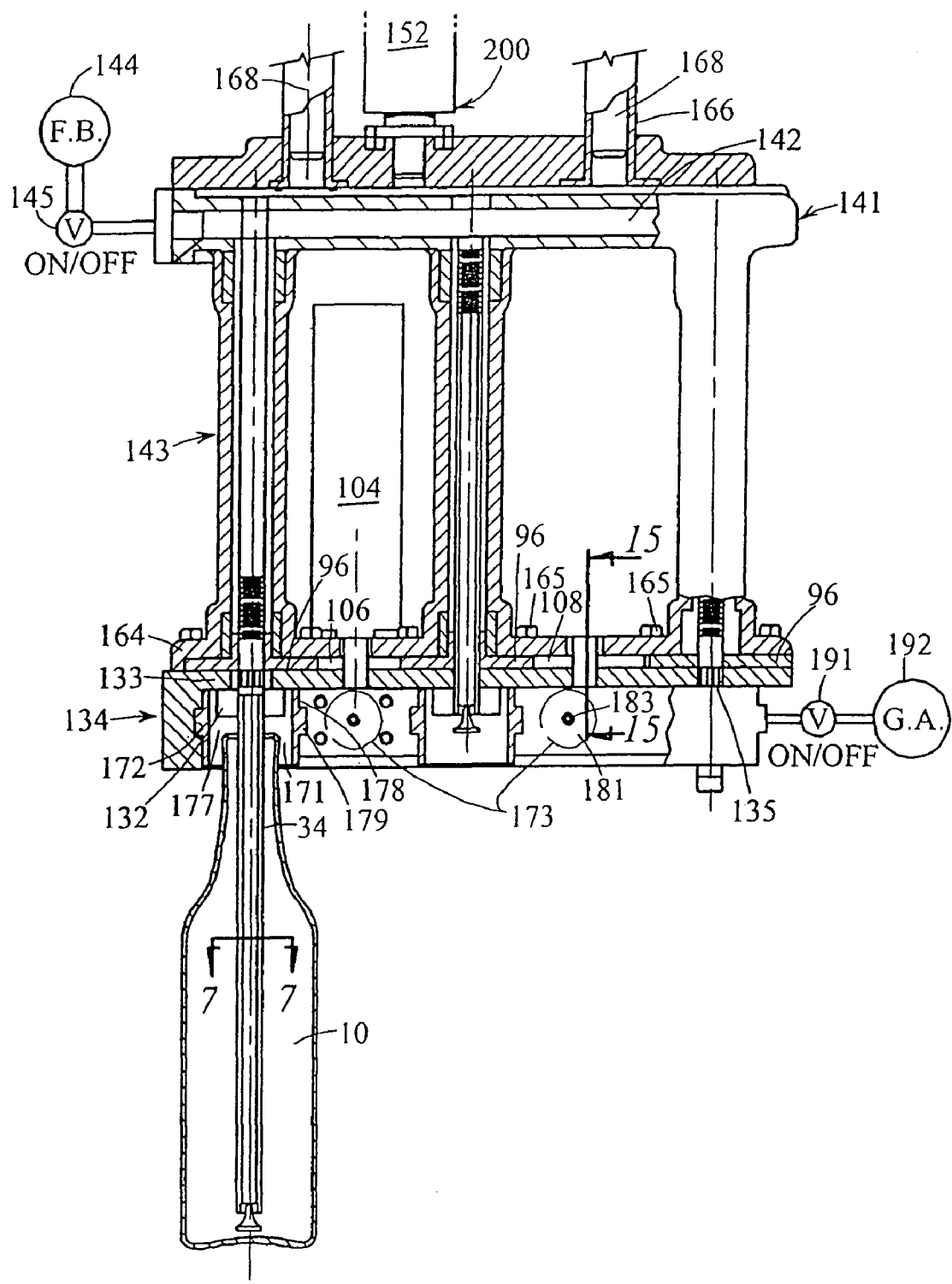
FIG. 14 shows an elevational view in section of the takeout mechanism shown in FIG. 13.

The takeout assembly has, at each bottle location, a blow tube 36 (FIG. 14). The blow tube support and drive assembly is the same as for the blow head mechanism except that the drive members 92 end at the driven gear portion and the guide keys 132 extend downwardly from the top wall 133 of the gripper housing 134 proximate the blow tube holes 135.

The takeout assembly also has a manifold housing 141 including an overhead distribution manifold 142 and three air distribution legs 143 which depend vertically from the overhead distribution manifold. Final blow (this includes air for final blow and/or internal cooling) depending on how the parison is being formed) air F.B./144 is supplied to the distribution manifold via a selectively controlled valve 145.

The base 164 of the manifold housing 141 is bolted onto the top wall 33 of the gripper housing 134 with a number of screws 165 with the driven gear portions 96, the drive gear 106 and the idler 108 located in a chamber located between the base of the manifold housing and the top wall of the gripper housing. The manifold housing has a pair of guide tubes 166 extending vertically upwardly from the top of the manifold housing which receive vertical guide rods 168 which are part of the Z axis drive 20.

Figure 15:
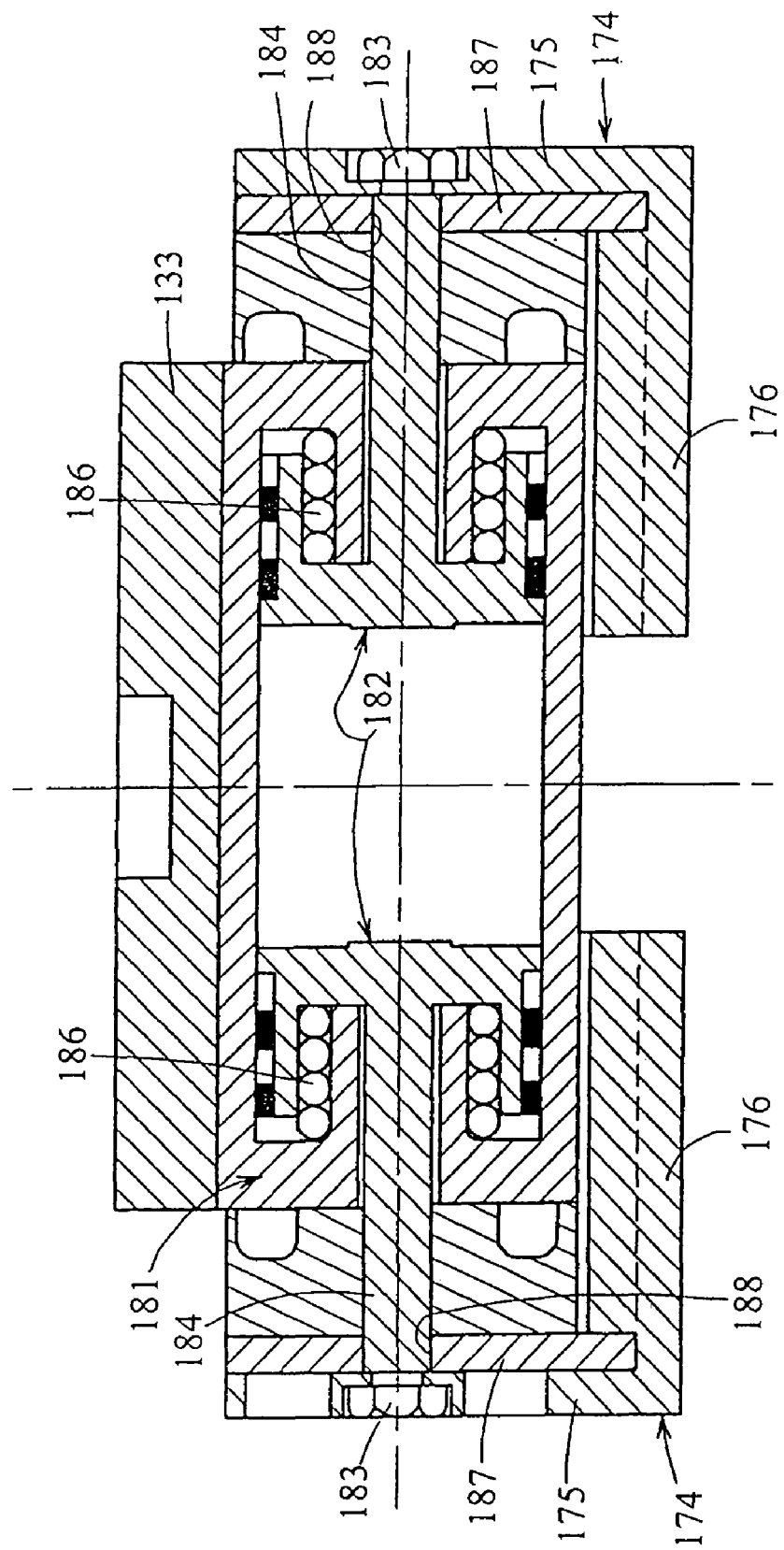
FIG. 15 is a view taken at 15-15 of FIG. 14.
Figure 22:
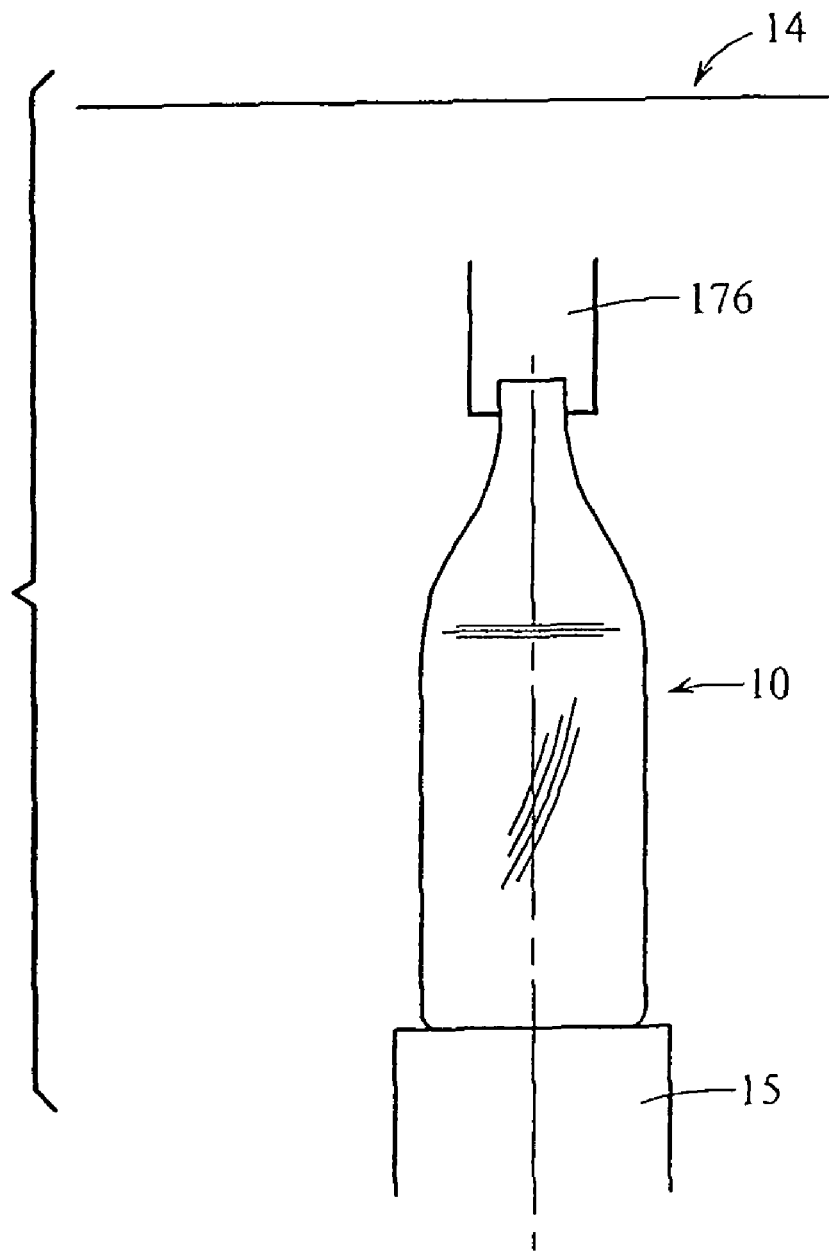
FIG. 22 is a view taken at 22-22 of FIG. 21.
Figure 25:
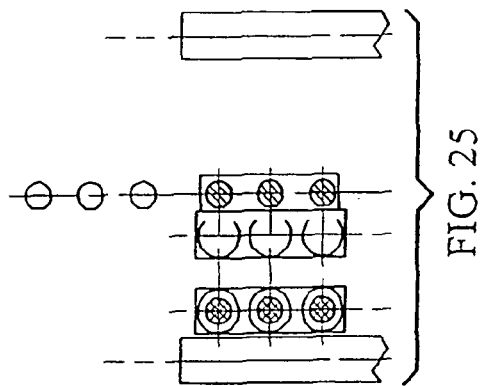
FIGS. 23-28 illustrate the synchronizm of a pair of takeout assemblies with their associated deadplate mechanisms.
Figure 28:
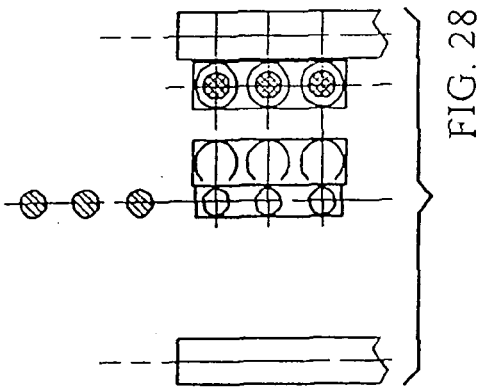
Figure 24:
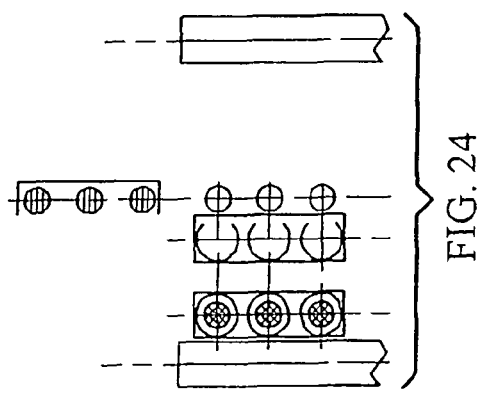
Figure 27:
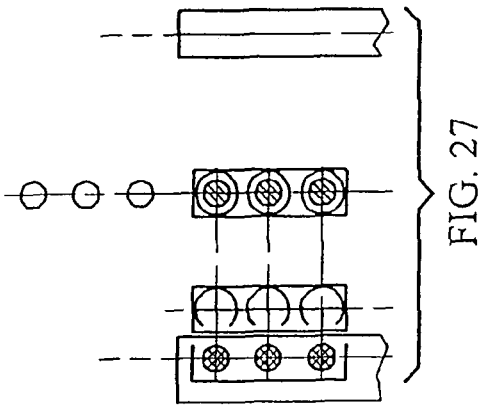
Figure 23:
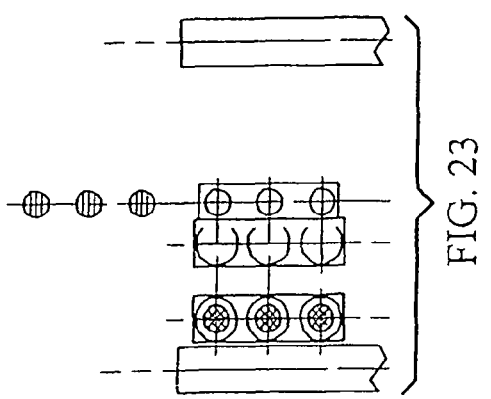
Figure 26:
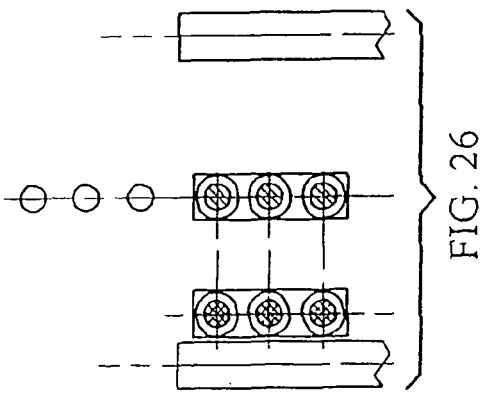

As can be seen from FIG. 14, the gripper housing may start as a solid block. A through slot 171 having opposed horizontal keyways 172 is defined at each bottle location extending from the front of the gripper housing to the rear thereof. These slots receive front and back gripper brackets 174 (FIG. 15) each of which has integral vertical front 175 and horizontal bottom 176 panels extending completely across the gripper housing and vertical transverse (front to back) panels 178 which include horizontal keys 179 which are received by the keyways 172. The vertical front panels 175 are open 177 between the vertical transverse panels to allow easy flow of the air from the interior of the bottle to atmosphere. Secured within each of a pair of through holes 173 which extend through the gripper housing from the front to the back of the housing is a double acting cylinder 181 including opposed piston and rod assemblies 182. A pair of screws 183 connect each gripper bar to the piston rods 184 on the side of the gripper bar and compression springs 186, located between the piston and the cylinder housing will normally maintain the gripper bars at the closed position. A locating plate 187 is secured to the front panel of the gripper bracket with a rod receiving hole 188 to locate the axis of the rod. Air under pressure is supplied via a valve 191 from a source of gripper air G.A./192 to the center of each cylinder to open the gripper bars. The gripper bars may have selectively sized semicircular inserts (not shown) so that the closed gripper bars will grip the formed bottles on the finish of the bottles.

FIGS. 16-22 schematically illustrate how three bottles that have just been formed in the blow station of a triple gob I.S. machine standing ready for pick-up (with the blow molds withdrawn) are sequentially processed by a takeout assembly. The takeout assembly will remove bottles from the blow station and deposit them on a conveyor 15 and the bottles will then be conveyed into a cooling tunnel 17 (the tunnel will isolate the hot air from an operator who may have to enter the space between the conveyors to service either the conveyor or the machine). The takeout assembly 140 is shown in FIG. 16 at the first deadplate position. Bottles have been formed in the blow molds 12. The molds open and the takeout assembly moves longitudinally to the pickup location shown in FIG. 17 where the formed bottles will be gripped. The gripped bottles will be removed from the pickup position and carried back to the first deadplate position (FIG. 18). In the event that the bottles are to be rejected, the gripper jaws can be opened at the first deadplate position to drop the rejected bottles into a cullet removal chute 13. The gripped bottles, supported at the blow station, are supported next to doorways or openings in associated cooling cans 220 which are supported on a deadplate mechanism 240 which is at its park position. The deadplate mechanism now moves horizontally, transversely towards the gripped bottles to the first deadplate position (until the gripped bottles are supported centrally within their associated cooling can) and the doors of the cooling cans are then closed (this is shown with the circle of the cooling can being a closed circle) FIG. 19. The takeout assembly and the deadplate mechanism then conjointly horizontally transversely move to a conveyor location adjacent a first, right side conveyor 15 (FIG. 20), the cooling can doors open and the takeout assembly then moves transversely away from the deadplate meachanism (FIG. 21) and then vertically downwardly from the up position to the down, deposit position (FIG. 22) to place the gripped bottles on the conveyor whereupon they will be released. The takeout is then returned to the up position and the deadplate mechanism and the takeout assembly will then be conjointly transversely displaced back to their initial positions shown in FIG. 16. Again the takeout can be displaced with sequential or simultaneous x and y movements. When molds are to be changed, both deadplate mechanisms can be displaced to the conveyor location to open up space for the operator.

With the bottles (Bottles No. 1) removed from the blow station (FIG. 18), an invert mechanism (not shown) will deliver formed parisons to the blow station and the blow molds will close. The parison will be blown and cooled to form a bottle (FIG. 19) and the molds will open so that the sequentially formed bottles (Bottles No. 2) can be removed (FIG. 20) by a second takeout assembly. This forming process will be repeated with the next formed bottles (Bottles No. 3) being removed by the first takeout assembly. The synchronous movements of the first takeout assembly and its associated deadplate mechanism and the second takeout assembly and its associated deadplate mechanism are illustrated in FIGS. 23-28.

During the time when the first takeout assembly is at the first deadplate position (FIG. 23), is displaced to the pickup position (FIG. 24) to grip a bottle, returns with the gripped bottles to the first deadplate position (FIG. 25), and waits for the first deadplate mechanism to move to the first deadplate position to capture the bottles and close the cooling can doors (FIG. 26), the second takeout assembly and second deadplate mechanism are located at the conveyor location adjacent a second, left side conveyor with bottles formed in the previous cycle located within the cans with the can doors closed. Before the first takeout assembly and first deadplate mechanism are displaced conjointly to the conveyor location adjacent the first conveyor (FIG. 27), the doors to the cans of the second deadplate mechanism open and the second takeout assembly is transversely displaced to displace the gripped bottles to a deposit location over the second conveyor whereupon the second takeout assembly is lowered from the up deposit location to a down deposit location to locate the gripped bottles proximate the second conveyor. The gripped bottles are released and the second takeout assembly is raised to the up deposit location. As the first takeout assembly and first deadplate mechanism are displaced from the first deadplate position to the conveyor position proximate the first conveyor, the second takeout assembly and second deadplate mechanism are conjointly displaced to their start locations (FIG. 28) to start their cycle again removing the next bottles (Bottles No. 2) formed in the blow station.

The basic cycle now repeats with the roles reversed for the first takeout assembly/deadplate mechanisms and the second takeout assembly/deadplate mechanism with the first takeout assembly/deadplate assembly returning to their start locations to receive the next formed bottles (Bottles No. 3). While the displacement of the takeout arm from the conveyor location to the pick up location is shown with sequential X and Y movements it should be understood that such movements could occur simultaneously.

Figure 29:
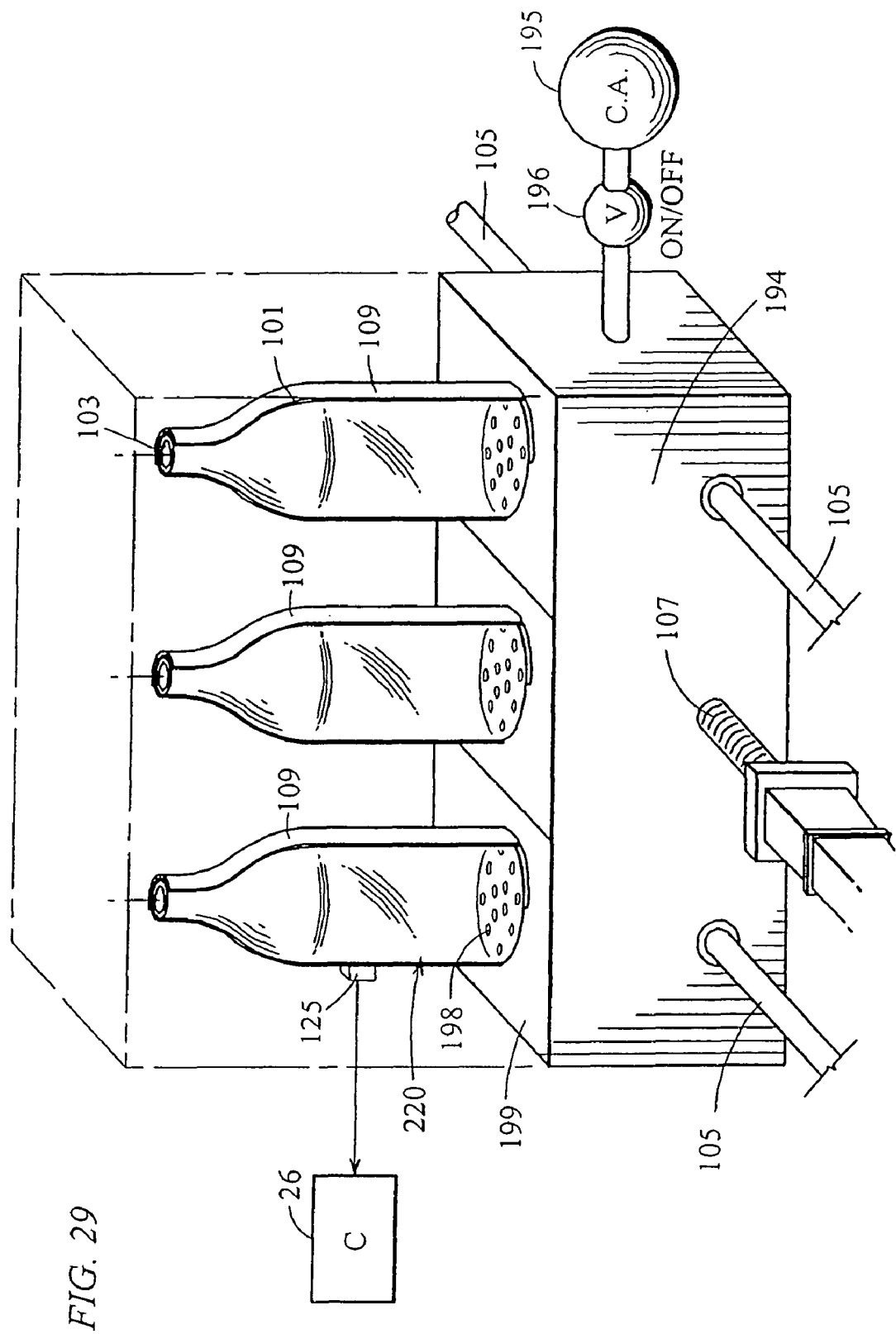
FIG. 29 is an oblique view of a the deadplate mechanism shown in FIGS. 16-21.
Figure 30:
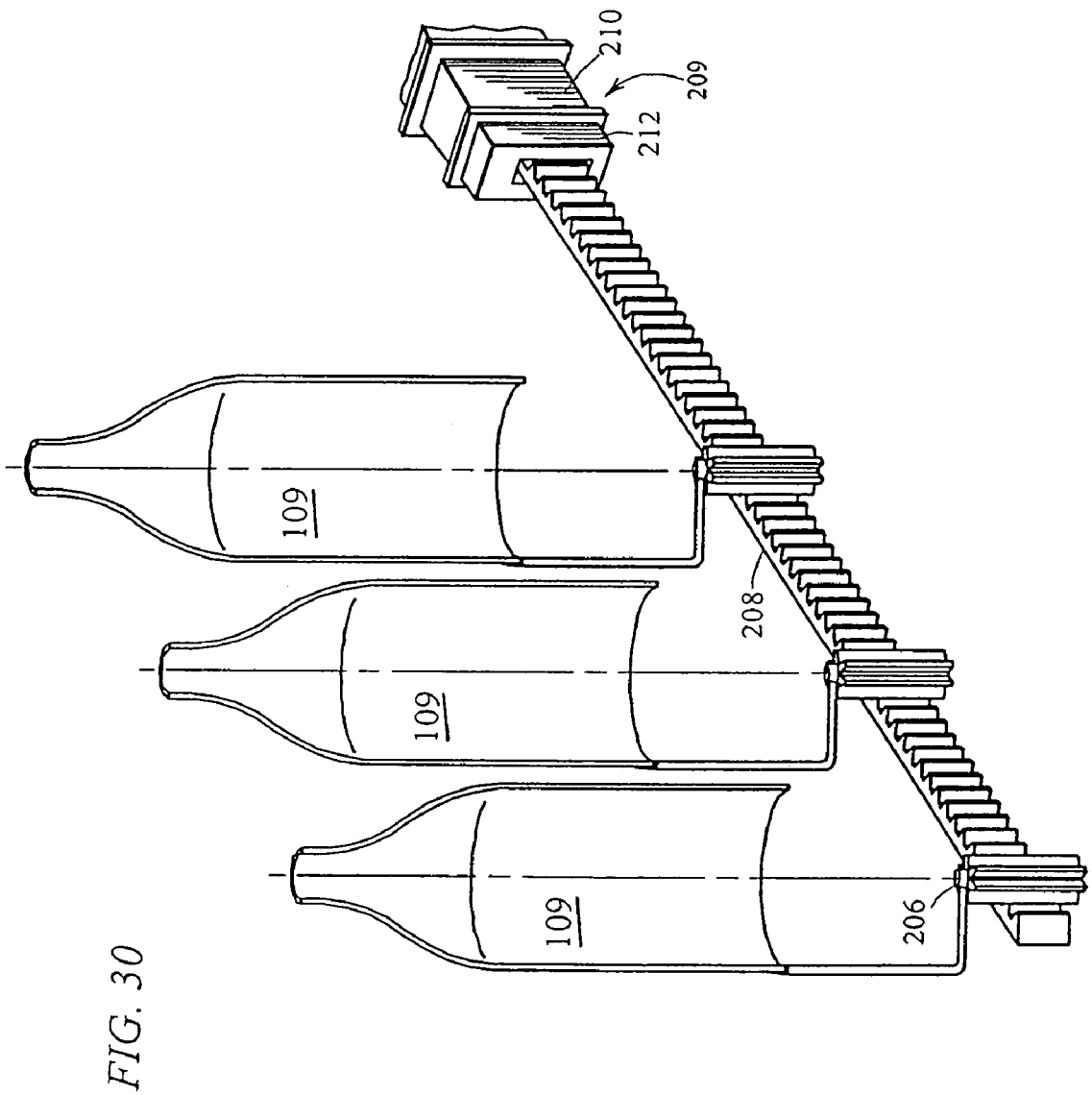
FIG. 30 is an oblique view of the mechanism for opening and closing the can doors.

FIGS. 29 and 30 illustrate a deadplate mechanism which has a plenum chamber 194 which is supplied cooling air C.A./195 controlled by a selectively actuated valve V/196. Cooling air is available throughout the entire period during which a bottle is located within a can and for longer periods to cool the can either before or after a bottle is located within the can. Cooling air enters the cans 220 through holes 198 in the top surface 199 of the plenum chamber blowing up against the bottom of a bottle supported above the top surface by a takeout assembly and up the space between the suspended bottle and the inside wall 101 of the can, leaving the can through the can opening 103 at the top of the can. The plenum chamber is supported for Y axis displacement by suitable rods 105 and is displaced by a Y axis drive 107. FIG. 21 schematically illustrates the door displacement mechanism for the deadplate mechanism cans. The doors 109 are coaxially mounted on a gear (a worm gear for example) 206 which is supported for rotation about its axis. Operatively connected with each gear is a worm (for example) 208 which is displaced by a drive 209 having a motor 210 connected to the worm via a rotary to linear converter 212 (alternates such as rack and pinions may be used).

The interior surface of a can is configured so that cooling air admitted into the can through the bottom inlet holes 198 in the top surface of the plenum chamber will follow the surface of the bottle during its passage to the exit hole 103. Air flow to a can will occur as desired to achieve the cooling of the bottle but in the preferred embodiment air flow is continuous from the time a bottle enters a can to the time a bottle leaves the can.

A temperature sensor 125 secured to one or more of the cans provides temperature data which should be stable over time (data would be compared at the same point in the cycle). The control C/26 which receives this data determines whether "Sensed Temperature At Can T°+/−X°" 126 (T and X can be manually or automatically inputted) and where the answer is answered in the negative, the control will "Reject The Bottles" 127. Where the cullet chute is located in the center, the deadplate mechanism can be displaced back to its ready position, the doors of the can can be opened, the takeout can be displaced to a position over the cullet chute and the bottles can be released.

The blow tube will be oscillated between the up and down positions with a displacement profile matched to the cooling requirements of the bottle from the moment the takeout assembly is lowered to its bottle gripping position until the gripped bottle is deposited onto the conveyor. As with the blowhead a convenient algorithm for defining this oscillation is shown in FIG. 12 and numerous cycles will occur while the bottle is gripped by a takeout assembly.

Figure 32:
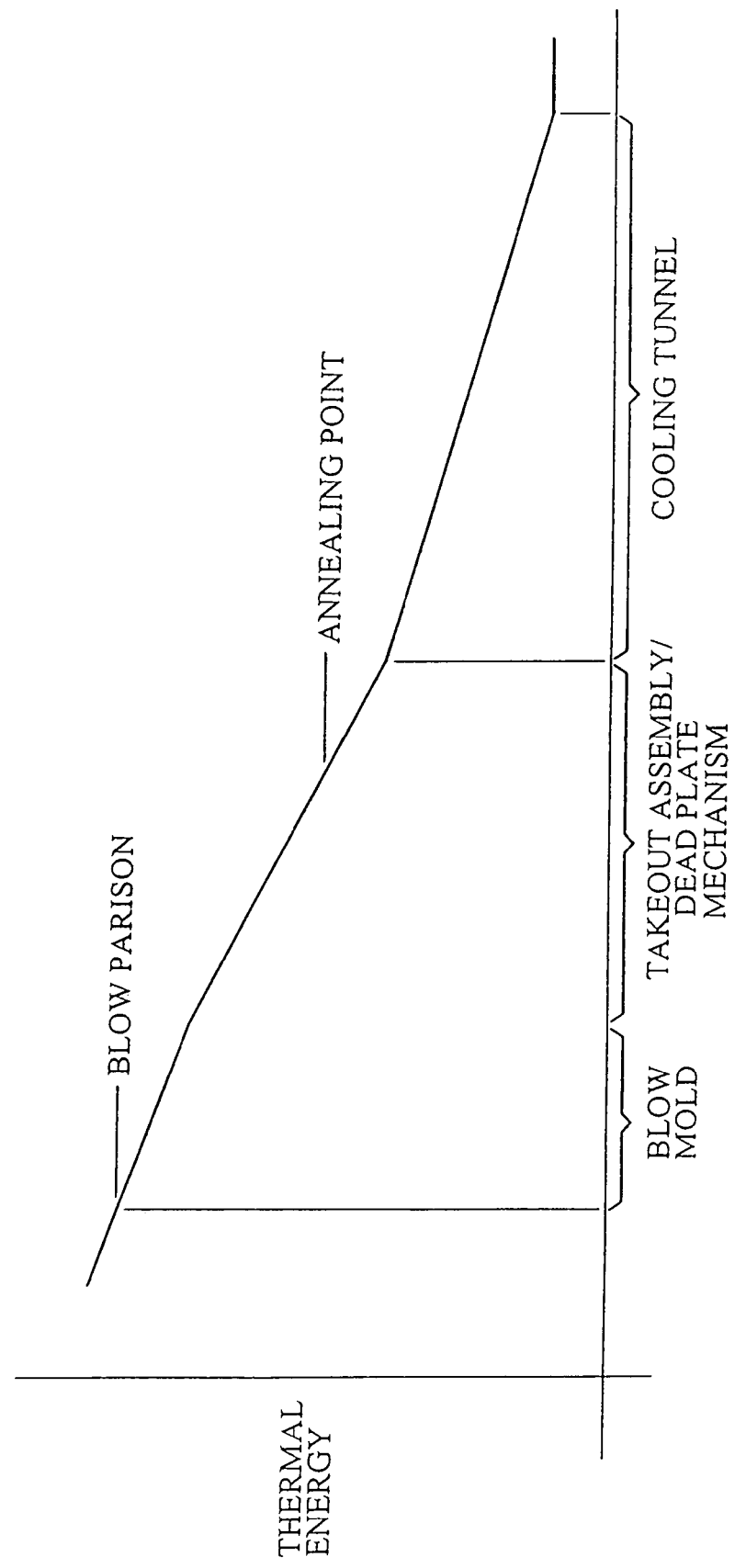
FIG. 32 is a temperature vs. position curve for the formed bottle.

Referring to FIG. 32 which tracks the thermal energy of the object along the glass forming process, it can be seen that the thermal energy continuously decreases from the time the parison is blown in the blow mold to the time the bottle is discharged from the cooling tunnel. Thermal energy is first removed by the internal cooling of the blown parison within the blow mold and the conjoint cooling of the blown parison by the blow molds. Cooling then continues from the time a bottle is gripped by a takeout assembly to the time it is deposited on a conveyor and then cooling occurs as the bottle proceeds along the conveyor.

Figure 31:
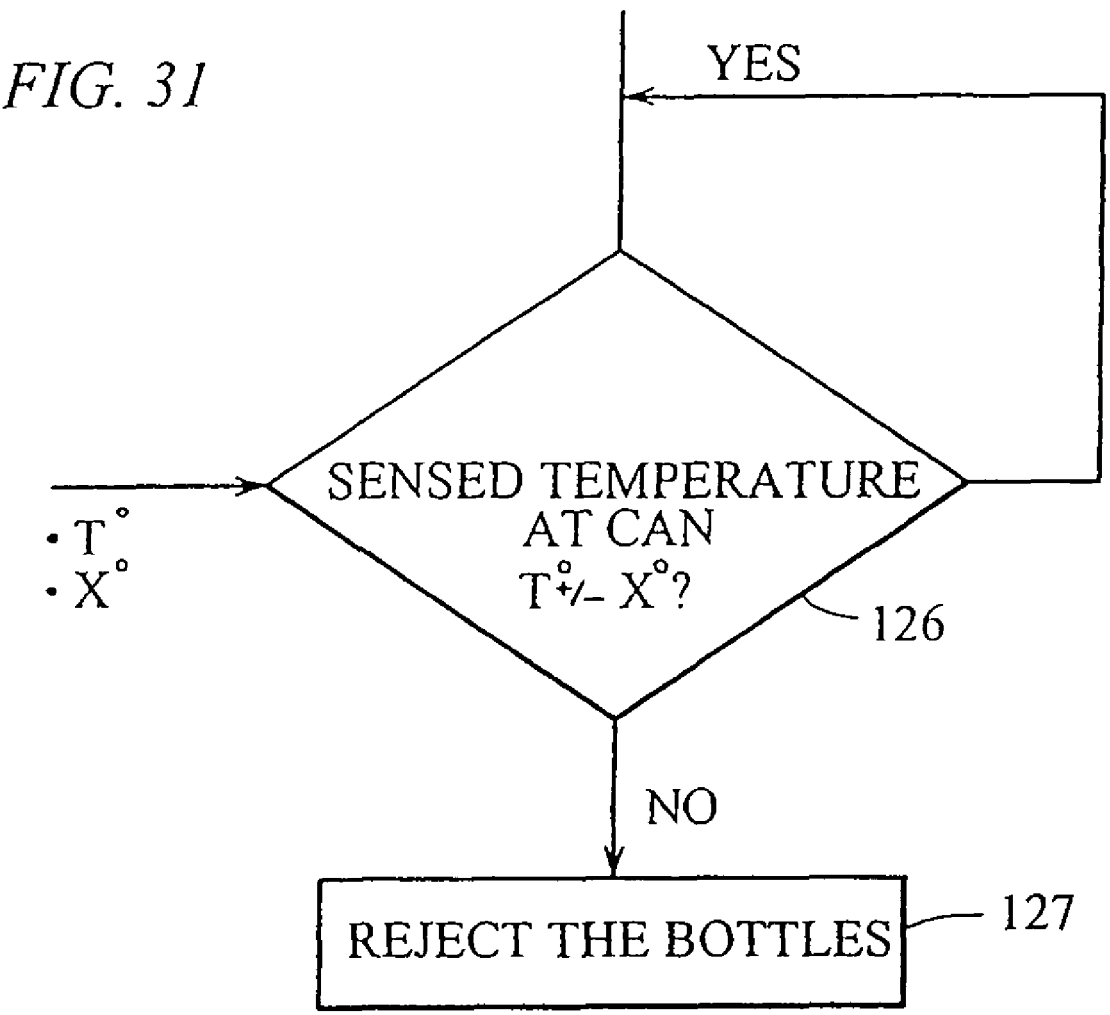
FIG. 31 is a logic diagram illustrating the operation of the temperature sensor.

As can be seen from FIG. 31, the thermal energy of the bottle has been reduced to the point where the bottle is fully tempered before it is deposited on the conveyor and accordingly further cooling can accordingly take place at a rapid rate without causing defects in the container. Referring to FIG. 16, conveyor cooling which may be within a tunnel or not. Cooling would continue for a distance that would be much shorter than the length of a conventional Lehr, perhaps as short as about 25 feet. If it is within a tunnel, the tunnel may be divided up into a number of cooling zones each of which has a fan 300 which supplies shop air to an inlet 302 within the tunnel directing the air upstream. Upstream of the inlet is an exhaust 304 which discharges the cooling air from the tunnel. If there is no tunnel the fans will simply blow cooling air at the bottles. When the bottles are sufficiently cooled they will be discharged from the conveyor for further processing which could include inspection and packing or filling.

The invention claimed is:

1. A blow head mechanism comprising
a blow head which is locatable on top of a closed blow mold in an I. S. Machine when the closed blow mold supports a formed parison, said blow head being supplied with pressurized air, when on top of closed blow mold, to form the parison into a bottle and, following bottle formation, to cool the interior surface of the formed bottle so that the blow mold can be opened and the bottle removed from the blow mold,
a support for supporting said blow head,
said blow head including a blow tube having an opening at the bottom thereof,
a first displacement mechanism arranged and configured to displace said support, and
a second displacement mechanism arranged and configured to displace said blow tube with respect to said support and said blow head, said second displacement mechanism including a profiled displacement motor,
wherein said blow tube may be displaced between an up position whereat said blow head is on top of a closed blow mold and whereat the bottom opening of said blow tube is proximate the top of blown parison supported by the closed blow mold and a down position whereat said blow head is on top of the closed blow mold and the bottom of said blow tube is located proximate the bottom of a blown parison supported within the closed blow mold, wherein said profiled displacement motor is configured to displace said blow tube in accordance with a displacement profile while said blow molds are closed and said blow head is on top of said closed blank molds:
from said up position to a first down position vertically downwardly from said up position following the blowing of the parison into a bottle,
from said first bottom down position to a second up position vertically upwardly from first down position following the location of said blow tube at said first down position, from said second up position to a second down position vertically downwardly below the location of said blow tube following the displacement of said blow tube from said first down position to said second up position, and
from said second down position to a third up position vertically upwardly from said second down position following its location at said second down position.

2. A blow head mechanism according to claim 1, wherein said profiled displacement motor comprises a servomotor, and
wherein the blow head mechanism includes a control for controlling the operation of said servomotor.

3. The blow head mechanism of claim 1 wherein displacement profile is defined such that said blow tube is displaced from its "up" position to a location where the upper neck portion meets the lower body portion at an average velocity greater than the average velocity at which the blow tube is displaced from a location where the upper neck portion meets the lower body portion to its down position at the bottom of the container.

4. The blow head mechanism of claim 3, wherein said profiled displacement motor is configured to maintain said blow tube proximate said bottom of said container for a selected period of time.

5. The blow head mechanism of claim 4, wherein said profiled displacement motor is configured to displace said blow tube from its "down" position to a location where the upper neck portion meets the lower body portion at an average velocity lower than the velocity at which said profiled displacement motor displaces said blow tube from said location at which the upper neck portion meets said lower body portion to its "up" position.

6. A blow head mechanism comprising:
a blow head assembly including a vertical post and a blow head arm coupled to the vertical post, with the blow head arm coupled to a blowhead and a first actuator being coupled to the blow head arm and configured to move the arm from an off position to an on position over the mold;
a second actuator coupled to the blow head arm and configured to move a blow tube from an up position to a down position a preselected number of cycles, with the blow tube coupled to an air supply; and
a control coupled to the first actuator, and the second actuator, and the air supply, the control configured with a displacement profile to control the second actuator and air supply, wherein the second actuator cycles the blow tube up and down as determined by the displacement profile during the time the blow head arm is in the on position.

7. The blow head mechanism of claim 6, wherein the displacement profile is configured to cycle the blow tube N times based on cooling requirements of the container.

8. The blow head mechanism of claim 7, wherein the cooling requirements are related to mass of the container and shape of the container.

9. The blow head mechanism of claim 6 wherein the container is one of a parison and a bottle.

10. The blow head mechanism of claim 6 wherein each of the first actuator and second actuator is a servomotor.

11. The blow head mechanism of claim 6 wherein the formed container has an upper neck portion and a lower body portion, the second actuator is configured to displace the blow tube from the up position to a location where the upper neck portion meets the lower body portion at an average velocity greater than the average velocity at which the blow tube is displaced from a location where the upper neck portion meets the lower body portion to its down position at the bottom of the formed container.

12. The blow head mechanism of claim 8 wherein the second actuator is configured to maintain the blow tube proximate the bottom of the container for a selected period of time.

13. The blow head mechanism of claim 9 wherein the second actuator is configured to displace the blow tube from the down position to a location where the upper neck portion meets the lower body portion at an average velocity lower than the velocity at which the second actuator displaces the blow tube from the location at which the upper neck portion meets the lower body portion to the up position.

* * * * *

UNITED STATES PATENT AND TRADEMARK OFFICE
CERTIFICATE OF CORRECTION

| | | |
|---|---|---|
| PATENT NO. | : 7,779,649 B2 | Page 1 of 1 |
| APPLICATION NO. | : 11/890056 | |
| DATED | : August 24, 2010 | |
| INVENTOR(S) | : Matthew R. Hyre and F. Alan Fenton | |

It is certified that error appears in the above-identified patent and that said Letters Patent is hereby corrected as shown below:

In the Drawings:

Fig. 1 "1" should be --10--

Column 3, Line 7:

"mechanism 1" should be --mechanism 10--

Column 7, Line 15:

"meachanism" should be --mechanism--

Signed and Sealed this
Seventh Day of February, 2012

David J. Kappos
*Director of the United States Patent and Trademark Office*